Patented Dec. 12, 1950

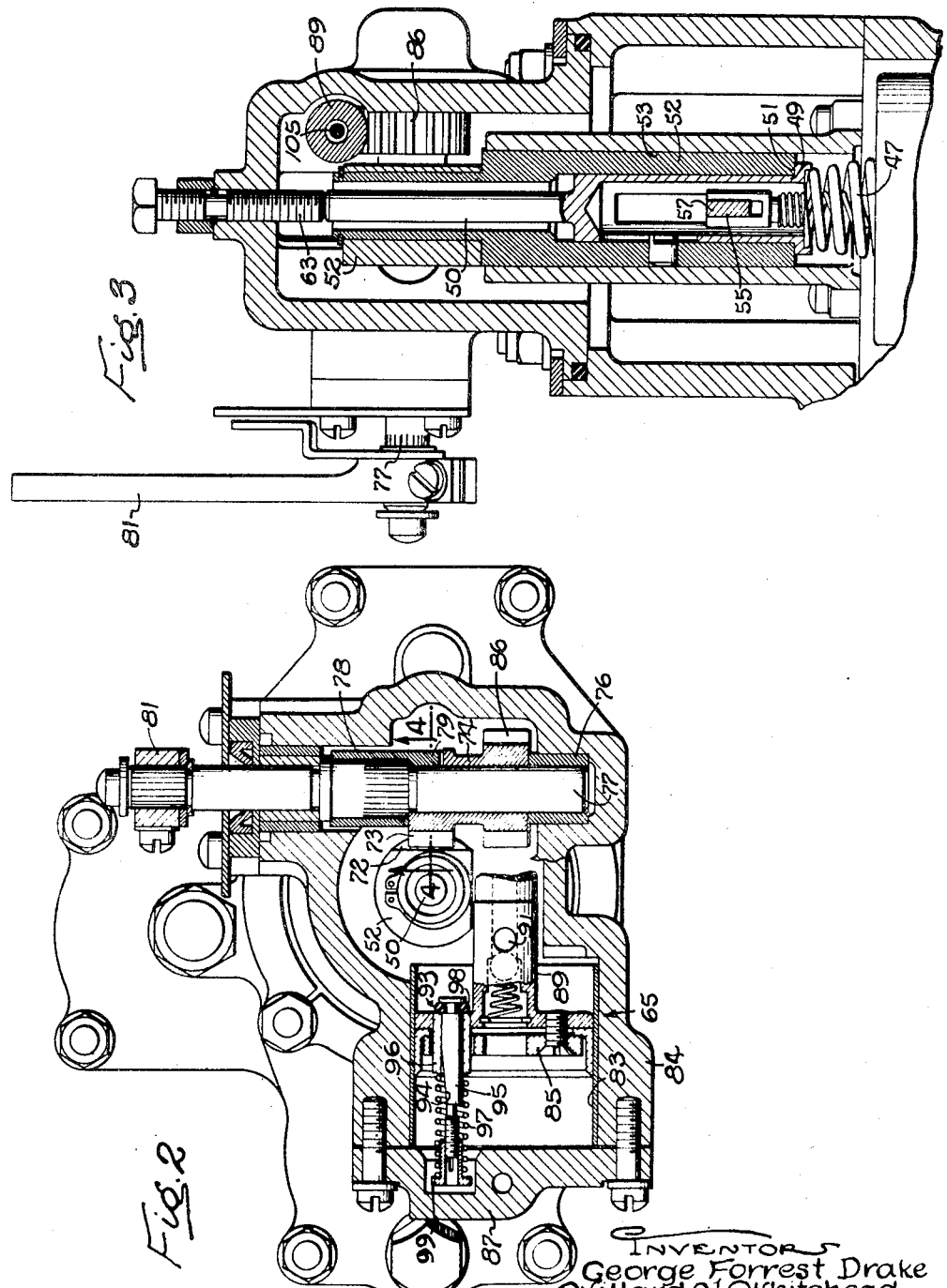

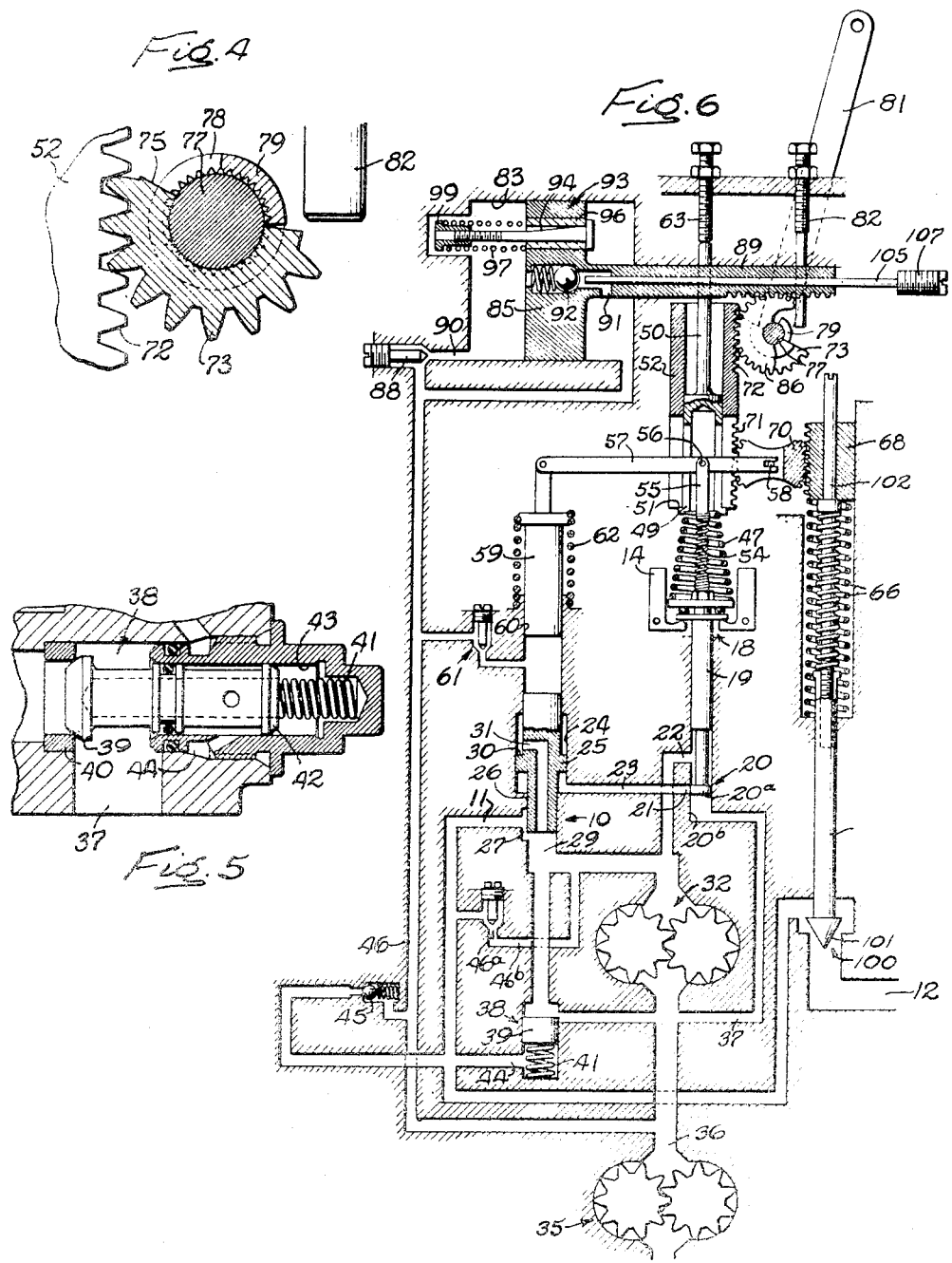

2,533,231

UNITED STATES PATENT OFFICE 2,533,231

SPEED-RESPONSIVE GOVERNOR

George Forrest Drake, Willard J. Whitehead, and Harland C. Plummer, Rockford, Ill., assignors to Woodward Governor Company, Rockford, Ill., a corporation of Illinois Application January 30, 1946, Serial No. 644,294

19 Claims. (Cl. 264—14)

This invention relates to governors for maintaining constant speed operation of prime movers, and in certain aspects relates more particularly to governors for prime movers of the continuous liquid fuel injection type such, for example, as gas turbines.

One object is to provide a governor of the above general character having a novel means for regulating the rate at which the prime mover speed may be increased.

Another object is to regulate the permissible rate of change of the governor speed setting.

A further object is to vary the permissible rate of speed increase progressive with changes in the prime mover speed.

Still another object is to provide freedom of adjustment of manually operable or controllable speed adjuster independently of the speed change controller.

Another object is to limit the range of control by the governor and provide for independent manual control of the fuel supply within part of the speed range.

The invention also resides in the novel and simple structure by which the foregoing objects are carried out.

Other objects and advantages of the invention will become apparent from the following detailed description taken in connection with the accompanying drawings, in which Figure 1 is a vertical central sectional view of a governor embodying the present invention.

Fig. 2 is a section taken along the line 2—2 (E—E) of Fig. 1.

Fig. 3 is a fragmentary section taken along the line 3—3 of Fig. 1.

Fig. 4 is a fragmentary section taken along the line 4—4 of Fig. 2.

Fig. 5 is a fragmentary sectional view through one of the governor valves.

Fig. 6 is a schematic view and hydraulic circuit diagram.

Figure 1:
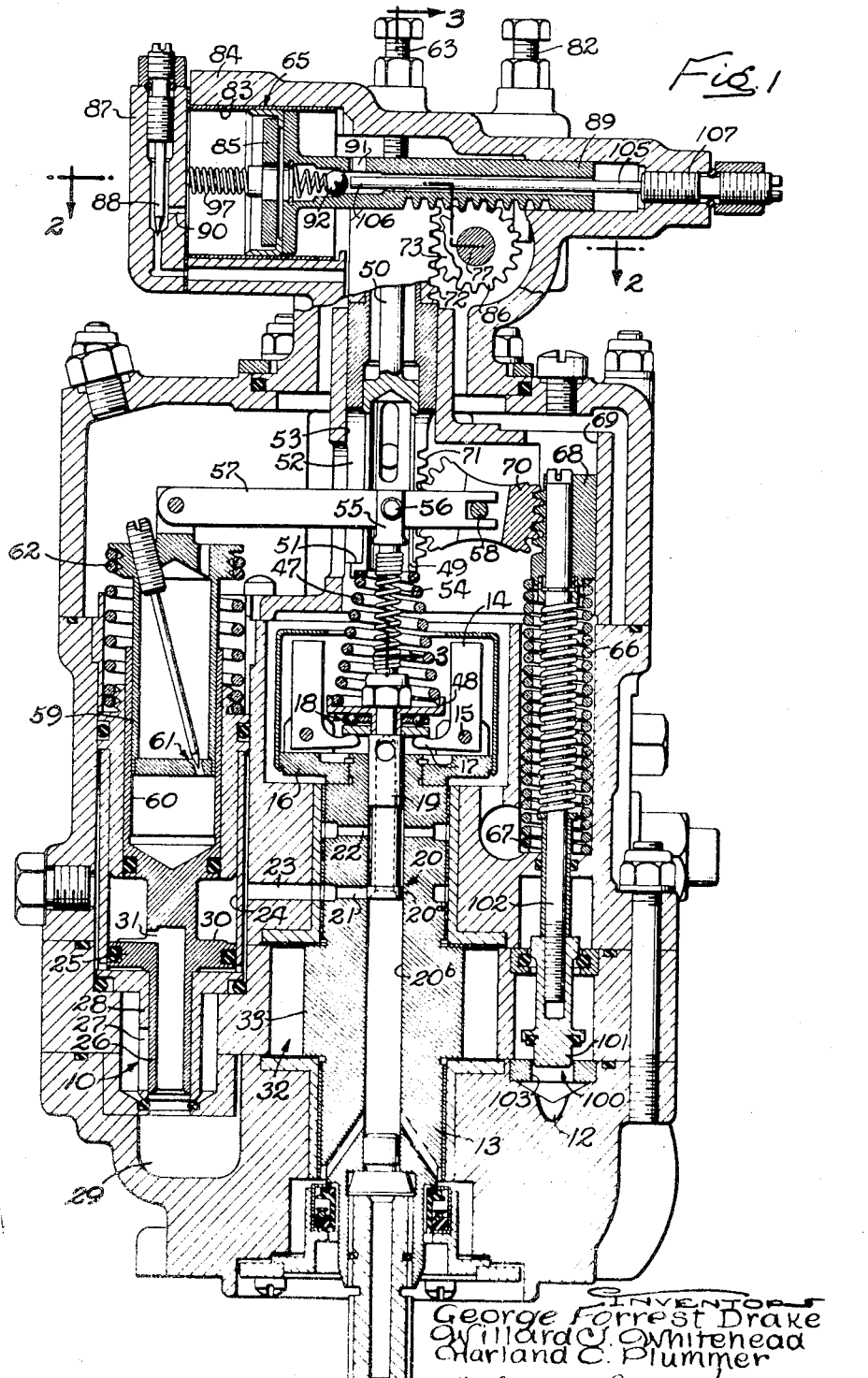

In the drawings, the invention is embodied in a governor driven in unison with a prime mover (not shown) to be controlled and operating to adjust a main valve 10 for variably regulating the flow of pressure fluid to a chamber 11 leading to a passage 12 from the which the prime mover is supplied continuously during its operation. The valve and all of the associated parts of the governor are housed in a multiport casing usually mounted on the prime mover to be controlled, and having a sleeve 13 projecting from the lower end of the casing and adapted to be coupled to a drive element of the prime mover.

In the present instance, the speed change detector of the governor is of the flyball type comprising upstanding weights or flyballs 14 pivoted at 15 on a head 16 fast on the upper end of the drive sleeve 13. Arms 17 on the flyballs bear upwardly against the lower race of a ball thrust bearing 18 whose upper race is connected to the upper end of the stem 19 of a pilot valve 20. The latter comprises a land 20$^a$ reciprocable in a bore 20$^b$ of the sleeve 13 and cooperating with ports 21. The pilot valve controls the flow of pressure fluid from a pressure line 22 to a passage 23 leading to the lower end of a cylinder 24 in which a piston 25 reciprocates to form a servo actuator variably energized by the governor and serving to open and close the valve 10.

Depending from the piston is a tubular stem 26 whose lower end cooperates with a vertically extending port 27 in a tube 28 to form the main fuel control valve 10, the port being triangular or of any other desired shape to produce the required flow characteristics. As the stem 26 rises from the valve-closed position shown in Fig. 1, more and more fluid is permitted to flow from a pressure chamber 29 forming the valve inlet into the outlet chamber 11 from which the prime mover is supplied. The piston 25 is urged downwardly continuously by pressure applied to the reduced upper end 30 of the piston 25 by fluid admitted from the pressure chamber 29 through the valve stem 26 and a port 31.

Fluid at the desired high pressure is supplied in the required volume to the chambers 22 and 29 by a gear pump 32 having its drive gear 33 fast on the drive sleeve 13. Liquid fuel at relatively low pressure, usually 15 p. s. i., is delivered by an engine driven pump 35 to a passage 36 leading to the inlet of the pump and supplying the latter continuously. This passage also communicates through a channel 37 with the lower end of the bore 20$^b$ of the pilot valve 20.

In order to effect accurate control of the fluid flow through the servo actuated or main fuel supply valve 10, it is desirable to maintain a constant pressure drop across the valve by varying the pressure maintained in the pressure chamber 29. To this end, a differentially acting valve 38 is provided to control the by-passing of fluid from the pressure chamber back to the low pressure line 36. In the form shown, this valve comprises a disk 39 (Figs. 5 and 6) urged toward a seat 40 by a spring 41 and by pressure exerted on a piston 42 slidable in a cylinder 43 which communicates through a passage 44 with the regulated pressure line 11. Thus, as the pressure of the fuel supplied to the engine decreases, the loading on the valve piston 39 decreases, and a correspondingly lower pressure is maintained in the pressure chamber 29. The spring loaded check valve 45 is interposed between the regulated pressure line 11 and a passage 46 connected to the low pressure line 36 to limit the maximum pressure that may be attained in the engine supply line. An adjustable needle valve 46$^a$ in a by-passage 46$^b$ provides a restricted but continuous connection between the pressure chamber 29 and the regulated engine supply line 11 so that with the valve 10 closed, fluid fuel may flow to the engine at a limited rate.

The centrifugal force exerted by the flyballs 14 is balanced against a speeder spring 47 of the compression type seated on a disk 48 on the upper end of the pilot valve stem 19. The upper end of the spring bears against the lower tubular end 49 of a rod 50 which has a one-way connection with a sleeve 52 that slides in a bore 53 in the upper part of the governor casing. The connection includes a flange 51 on the rod normally abutting against the lower end of the sleeve 52 (Fig. 3). As the sleeve is lowered, the spring 47 is further compressed thereby increasing the effective speed setting of the governor. Upward movement of the adjusting rod 50 is limited by an adjustable stop 63 which determines the idling speed setting of the governor although the actuating sleeve 52 may, for a purpose to appear later, move upwardly after the rod 50 has encountered the stop 63.

To impart temporary speed droop and adapt the governor for maintaining isochronous operation of the controlled prime mover, an auxiliary coiled spring 54 is disposed within the speeder spring 47 and arranged to act either in compression or tension on the pilot valve stem 19 to which the lower end of this spring is attached. The other end is attached to a plunger 55 which is slidable in the rod end 49 and pivotally connected at 56 to a lever 57 fulcrumed on a cross-shaft 58. At its other end, the lever is connected to a compensating receiving piston 59 slidable in a cylinder 60 which is formed within the servo piston 25 and communicates with the low pressure fluid space through a needle valve 61 on the piston 59. A spring 62 coiled around the piston 59 acts either in compression or in tension to return the piston to the centered position shown as permitted by fluid leakage through the needle valve following a movement of the servo piston 25.

In accordance with the present invention, provision is made for regulating the permissible rate of change of the governor speed adjustment so as to thereby limit the supply of fuel from being increased at too rapid a rate. Herein, this is accomplished by biasing the speed-adjusting member or rod 50 in the speed-increasing direction and throttling the rate of movement of the rod by means of a speed-limiting device such as a dashpot 65. The biasing means comprises a spring 66 acting in compression between an abutment 67 in the governor casing and a rack bar 68 slidable vertically in a guideway 69. The teeth of the rack mesh with one side of a gear 70 mounted on the cross shaft 58 and meshing on its opposite side with rack teeth 71 on the vertically slidable sleeve 52 against which the flanged lower end of the adjusting rod 50 is normally held by the speeder spring 47.

Rack teeth 72 on the upper end of the sleeve 52 mesh with a partial gear 73 on one end of a sleeve 74 (Figs. 2 and 4) which is cut away on one side to form a slot 75 extending nearly a half revolution around the gear. The sleeve 74 is loose on a shaft 77 which is journaled at one end in a bearing 76 of the gevorner casing. The opposite end of the shaft is journaled in and projects outwardly through the governor casing. Intermediate its ends, the shaft 77 is splined into a sleeve 78 which has an arcuate lug 79 projecting from its end into the sleeve slot 75. The slack in the rotary lost motion connection thus formed between the sleeve 74 and the shaft 77 corresponds approximately to the total speed-adjusting range of the governor so that the shaft may be turned in the speed-increasing direction to any desired position ahead of the sleeve 74 and the adjusting rod 50 without movement of the latter.

The outer end of the shaft 77 is connected to a crank 81 which may be moved to different selected speed settings through the usual cable or linkage connection to a suitable manually operable control lever (not shown) embodying frictionally acting means to maintain each selected lever position. The extent of adjusting movement in the speed-increasing direction is limited by suitable means such as a screw stop 82 (Figs. 1, 4 and 6) positioned to engage one end of the partial gear 73.

The dashpot 65 by which the speed-increasing motion of the speed-adjusting rod 50 by the springs 66 is controlled comprises a cylinder 83 formed in the casing extension 84 and having a piston 85 whose tubular rod 89 is formed with rack teeth meshing with a gear 86 on the sleeve 74. The rod end of the cylinder is open to the low pressure oil supply while the other end is closed by a head 87 in which a needle valve 88 governs the flow of fluid out through a passage 90 to throttle the piston movement in the speed-increasing direction, that is, to the left as viewed in Figs. 1 and 6. As the piston moves in the opposite direction, oil at low pressure is permitted to flow into the head end of the cylinder 83 through a port 91 and a check valve 92 which is spring closed during the speed-increasing movement of the piston. By adjusting the setting of the needle valve, it will be apparent that the rate of the speed-adjusting movement may be varied as desired.

The permissible rate of increase of the fuel supply to the engine may be greater at high speed than at low speed, and the rate of change may be progressive. To permit of such change, means is provided for changing the effectiveness of the dashpot progressively with the speed-increasing movement of the governor speed adjuster after a permissible speed, for example 60 per cent of maximum, has been attained. Herein, this means comprises an auxiliary by-pass orifice 93 (Figs. 3 and 6) formed by tapering one side 94 of a rod 95 which is slidable in a bushing 96 that projects through the piston 85. A compression spring 97, acting between the bushing 96 and a head 99 screwed onto the rod 94, urges the latter in a direction to hold a seal 98 thereon against the end of the bushing 96 thereby maintaining the auxiliary orifice closed. As the piston moves to the left, the rod head 99 encounters the cylinder head 87 so that in the continued speed-increasing movement of the piston 85, the seal 98 is moved away from the bushing 96 to open the auxiliary orifice, the effective area of which is then increased progressively in the continued movement of the piston. The speed of piston movement, and, therefore, the rate of speed adjustment of the governor, is thus increased progressively. By adjusting the head 99 along the rod 94, the point in the speed-adjusting range at which the auxiliary orifice becomes effective may be varied as desired.

When the speeder spring adjusting rod 50 is moved in the speed-decreasing direction as limited by the stop screw 63 (Figs. 3 and 6) above described, the governor maintains operation of the engine at a predetermined idling speed below which it is difficult to effect suitable governor control of the prime mover. The engine may be run below this speed by restricting the fluid flow manually and cutting it off if desired by further movement of the speed-adjusting lever 81 independently of the governor speed adjuster 50. In such further movement, the sleeve 52 is raised away from the flange 51 on the rod 50 and acts through the gear 70 and the rack 68 to close an auxiliary valve 100 in the fuel supply line 12. As shown, this valve comprises a cone 101 carried on the lower end of a rod 102 on the rack 68 and cooperating with a seat 103.

If desired, means may be provided for disabling the dashpot 65 below any desired speed such, for example, as the idling speed determined by the stop 63 so that below this speed, the rate of change in the fuel supply in the speed-increasing as well as in the speed-decreasing direction may be varied as desired by manipulation of the control lever 81. This may be accomplished by a rod 105 (Figs. 1 and 6) projecting through the hollow piston rod 89 and adjustably mounted in the casing as indicated at 107. The end 116 of the rod is positioned to engage and hold the ball 92 unseated in the positions of the piston 85 below the idling speed position. Thus, fluid is free to flow into and out of the head end of the dashpot cylinder until the speed setting has risen above the value at which the check valve 92 again becomes effective.

In operation of the prime mover equipped with a governor control as above described, fuel is admitted to the engine during starting by the auxiliary valve 100, such supply being variable as desired, by adjustment of the regulating shaft 77. When the engine speed rises above the idle speed value, the governor takes control and by variably positioning the valve 10, automatically regulates the pressure in the engine supply line 11 so as to maintain operation of the engine at a constant speed determined by the setting of the governor speed-adjusting member 50. The biasing springs 66 urge this member in the speed-increasing direction so that the member follows the movement of the adjusting shaft 77 in the speed-decreasing position. The shaft may, however, be moved rapidly and ahead of the adjusting member 50 in the speed-increasing direction as permitted by the slack in the lost motion connection 78, 79. Under the action of the springs 66, the speed-adjusting member 50 follows up the manually operable adjusting element 77 at a rate determined by the action of the dashpot 65 and stops in the selected position when the slack of the lost motion connection has been taken up. Thus, the permissible rate of increase in the fuel supply to the prime mover is limited in spite of the fact that the manually operable adjusting element may be moved quickly to any desired speed setting.

We claim as our invention:

1. The combination of a speed-responsive governor having a speeder spring, a member movable back and forth to vary the stress of said spring and thereby change the governor speed setting, spring means capable of overcoming said speeder spring and urging said member in the speed-increasing direction, a dashpot regulating the rate of movement of said member by said spring means while permitting free movement of the member in the opposite direction, an adjusting element movable in opposite directions to different selected positions according to changes desired in the speed setting of the governor, and means providing a limited lost motion connection between said adjusting element and said member.

2. The combination of a speed-responsive governor, a member movable back and forth to change the speed setting of said governor, means biasing said member in the speed increasing direction, means acting on said member and automatically operable to throttle the rate of movement of said member by said biasing means while permitting free movement of the member in the opposite direction, and an adjusting element having a lost motion connection with said member and movable in opposite directions to different selected positions according to changes desired in the speed setting of the governor, said biasing means operating after movement of said element in the speed-increasing direction to take up the slack in the connection and to urge said member in the speed-increasing direction at a rate controlled by said throttling means.

3. The combination of a speed-responsive governor, a member movable back and forth to change the speed setting of said governor, means biasing said member in the speed-increasing direction, means acting on said member and automatically operable to throttle the rate of movement of said member by said biasing means while permitting free movement of the member in the opposite direction, and an adjusting element having a lost motion connection with said member and movable in opposite directions to different selected positions according to changes desired in the speed setting of the governor.

4. The combination of a speed-responsive governor, a member movable back and forth to change the governor speed setting correspondingly, spring means urging said member in the speed-increasing direction, a dashpot regulating the rate of movement of said member by said spring means while permitting free movement of the member in the opposite direction, an adjusting element movable in opposite directions to different selected positions according to changes desired in the speed setting of the governor, and means providing a connection between said adjusting element and said member permitting movement of the member in the speed-decreasing direction against the action of said spring means or movement of the element ahead of said member in the speed-increasing direction.

5. The combination of a speed-responsive governor, a member movable back and forth to correspondingly change the speed setting of said governor, an actuating element movable back and forth to locate said member in different selected positions, means providing an operative connection between said member and element permitting movement of the element ahead of the member in one direction, means biasing said member in said last mentioned direction to follow up the movement of said element, and means for throttling the motion of said member by said biasing means while permitting freedom of movement of the member with said element in the opposite direction.

6. The combination of a speed-responsive governor, a member movable back and forth to correspondingly change the speed setting of said governor, an actuating element movable back and forth to locate said member in different selected positions, means providing an operative connection between said member and element permitting movement of the element ahead of the member in one direction, means biasing said member in said last mentioned direction to follow up the movement of said element, a fluid dashpot for throttling the motion of said member by said biasing means including a fluid escape orifice of variable size, and means for varying the effective area of said orifice automatically with the movements of said member.

7. The combination of a speed-responsive governor, a member movable back and forth to correspondingly change the speed setting of said governor, an actuating element movable back and forth to locate said member in different selected positions, means providing an operative connection between said member and element permitting movement of the element ahead of the member in one direction, means biasing said member in said last mentioned direction to follow up the movement of said element, means for throttling the motion of said member by said biasing means, means for adjusting said throttling means to vary the rate of motion of said member by said biasing means, and means for actuating said adjusting means automatically in accordance with changes in the position of said member.

8. The combination of a speed-responsive governor, a member movable back and forth to correspondingly change the speed setting of said governor, means acting on said member to resist movement thereof in at least one direction and thereby control the rate of said movement and means for varying the amount of the resistance offered by said last mentioned means with changes in the speed setting of said governor.

9. The combination of a speed-responsive governor, a member movable back and forth to correspondingly change the speed setting of said governor, a speed controller acting on said member to limit the rate of movement thereof in at least one direction, said controller including a device selectively movable to vary the permissible rate of said movement, and a motion transmitting connection between said member and said device operable to adjust said speed controller with the movement of the member.

10. The combination of a speed-responsive governor, a member movable back and forth to correspondingly change the speed setting of said governor, a fluid dashpot having an outlet orifice of variable size and acting on said member to regulate the speed of movement thereof, and means for varying the effective size of said orifice in accordance with changes in the speed setting of said governor.

11. The combination of means providing a fluid passage, a main valve means controlling the flow of fluid through said passage between full and a predetermined minimum flow, an auxiliary valve for throttling the flow of fluid through said passage between said minimum flow and complete closure of the passage, a speed-responsive governor for actuating said main valve and having a movable speed-adjusting member, means for limiting the movement of said member to a position corresponding to said minimum flow position of said main valve means, and a single actuating element for moving said adjusting member to said limit position and in its further movement to actuate said auxiliary valve means and further reduce the fluid flow through said passage.

12. The combination of means proving a fluid fuel supply passage, a speed-responsive governor, a member movable back and forth to correspondingly change the speed setting of said governor, a stop for limiting the motion of said member in the speed-decreasing direction, an element for actuating said member and adapted for movement in the speed-decreasing direction and independently of the latter beyond the position of said member determined by said stop, a valve controlling the fluid flow through said passage and actuated by said governor to control the fluid flow until said limit position of said member has been reached, an auxiliary normally open valve also controlling the flow of fluid through said passage, and an aperture connection between said element and said auxiliary valve operable to close the latter progressively in the final movement of the element after said member has reached said limit position.

13. The combination of means providing a fluid fuel supply passage, a speed-responsive governor, a member movable back and forth to correspondingly change the speed setting of said governor, an actuating element, valve means controlling the fluid flow through said passage and actuated by said governor to regulate the fluid flow through said passage, and means connecting said element, said speed adjusting member and said valve means and operating over part of the operating range of said element to move said member and over the remainder of the range to adjust said valve means and further throttle the flow of fluid through said passage.

14. The combination of means providing a fluid passage, main and auxiliary valves controlling the fluid flow through said passage, a speed-responsive governor for actuating said main valve means, and a single manually operable device selectively movable to actuate said auxiliary valve means and to adjust the speed setting of said governor.

15. The combination of means providing a fluid passage, main and auxiliary valves controlling the fluid flow through said passage, a speed-responsive governor for actuating said main valve means, a member movable to vary the speed adjustment of said governor, and a selectively movable adjusting element for actuating said member progressively over part of its range of movement and for actuating said auxiliary valve means over the remainder of its range.

16. The combination of means providing a fluid passage, a main valve controlling the flow of fluid through said passage between full and a predetermined minimum flow, an auxiliary valve for throttling the flow of fluid through said passage between said minimum flow and complete closure of the passage, a speed-responsive governor for actuating said main valve and having a movable speed adjusting member, means for limiting the movement of said member to a position corresponding to minimum speed adjustment, and a single actuating element for moving said adjusting member to said limit position and in its further movement to actuate said auxiliary valve means and reduce the fluid flow through said passage.

17. The combination of, a speed responsive governor having a member movable back and forth to correspondingly change the speed setting of the governor, a movable actuating element having a one-way connection with said member for moving the latter in a direction to decrease the governor speed setting, said element being movable away from said member in the reverse direction, means yieldably biasing said member in the latter direction to a position determined by the position of said actuating element, a selectively adjustable device normally acting to restrict the rate of movement of said member by said biasing means while permitting freedom of movement of the member by said element in the opposite direction, and a motion transmitting connection between said member and said device and operable to adjust the latter and respectively reduce and increase the permissible rate of movement of the member by the biasing means with decreases and increases in the speed-setting of said governor.

18. The combination of a speed responsive governor having a member movable back and forth to correspondingly change the speed setting of the governor, a movable actuating element having a connection with said member for moving the latter in a direction to decrease the governor speed setting, said element being movable away from said member in the reverse direction, means yieldably biasing said member in the latter direction to a position determined by the position of said actuating element, and a device normally acting to limit the rate of movement of said member by said biasing means while permitting freedom of movement of the member by said element in the opposite direction, said device including a part movable progressively in opposite directions to correspondingly change the limiting action of the device and therefore the rate of movement of the member by said biasing means.

19. The combination of, a speed responsive governor having a speeder spring the stressing of which determines the speed setting of the governor, a member movable back and forth to correspondingly change the loading of said spring and thereby the speed setting of the governor, a reversely movable actuating element having a one-way connection with said member for moving the latter in a direction to decrease the governor speed setting, said element being movable away from said member in the reverse direction, a spring adapted to overcome said speeder spring and move the member in the latter direction to a position determined by the position of said actuating element, and a device normally acting to throttle the motion of said member by said second spring while permitting freedom of movement of the member by said element in the opposite direction.

GEORGE FORREST DRAKE.
WILLARD J. WHITEHEAD.
HARLAND C. PLUMMER.

REFERENCES CITED

The following references are of record in the file of this patent:

UNITED STATES PATENTS

| Number | Name | Date |
|---|---|---|
| 2,352,736 | Richmond | July 4, 1944 |